United States Patent [19]
Shepard

[11] Patent Number: 5,943,347
[45] Date of Patent: Aug. 24, 1999

[54] APPARATUS AND METHOD FOR ERROR CONCEALMENT IN AN AUDIO STREAM

[75] Inventor: Steven Shepard, Cupertino, Calif.

[73] Assignee: Silicon Graphics, Inc., Mountain View, Calif.

[21] Appl. No.: 08/659,947

[22] Filed: Jun. 7, 1996

[51] Int. Cl.[6] ........................ H04L 1/00
[52] U.S. Cl. .................. 371/31; 381/94.5; 704/201
[58] Field of Search .................. 395/2.31; 371/31; 381/94.5; 704/201

[56] References Cited

U.S. PATENT DOCUMENTS

| | | | |
|---|---|---|---|
| 5,097,507 | 3/1992 | Zinser et al. | 381/31 |
| 5,208,816 | 5/1993 | Seshardi et al. | 371/43 |
| 5,615,298 | 3/1997 | Chen | 395/2.37 |
| 5,774,837 | 6/1998 | Yeldener | 704/208 |

OTHER PUBLICATIONS

Dal Degan, "Communications by Vocoder on a Mobile Satellite Fading Channel", Proc. IEEE Int'l. Conf. on Communications, 1985, pp. 771–775, Dec. 1985.

Rosenberg, "Dictionary of Computers, Information Processing, and Telecommunications", second edition, John Wiley & Sons, 1987, p. 447, Dec. 1987.

Goodman et al., "Waveform Substitution Techniques for Recovering Missing Speech Segments in Packet Voice Communications", IEEE Transactions on Acoustics, Speech and Signal Processing, vol. ASSP–34, No. 6, Dec. 1986, pp. 1440–1448.

*Primary Examiner*—Stephen M. Baker
*Attorney, Agent, or Firm*—Wagner, Murabito & Hao

[57] ABSTRACT

A method for concealing errors during transmission of audio data packets. Initially, the fundamental pitch period of a data packet is determined. A value indicating this fundamental pitch period is added as a preamble to the data packet prior to its transmission. When a data packet is received, it is checked for dropped or corrupted data. If there are any errors, the fundamental pitch period is replicated with the data from the previous frame the requisite number of times and substituted in replacement thereof. The audio is then played back so the impact of any errors is perceptually insignificant.

12 Claims, 5 Drawing Sheets

APPARATUS AND METHOD FOR ERROR CONCEALMENT IN AN AUDIO STREAM

FIELD OF THE INVENTION

The present invention pertains to an apparatus and method for concealing errors that may occur in an audio stream.

BACKGROUND OF THE INVENTION

In the past, audio recordings and transmissions were primarily handled in a continuous, analog format, whereby the audio information is conveyed as fluctuations in voltage or frequency. Some analog audio examples include phonographic records, cassette tapes, AM/FM radio transmissions, television broadcasts, etc. However, with the advent of the information age, audio data is increasing being stored and transmitted in a digital format. In a digital format, the audio information is stored, manipulated, and transmitted as a series of discrete bits (i.e., "1's" and "0's") of data. Some examples of digital audio include compact discs, CD-ROM discs, optical disk drives, fiber optics, multi-media, etc. Indeed, some television broadcasts (e.g., Digital Satellite System—DSS) and telephone communications are now being transmitted entirely in a digital format.

In order to facilitate the transfer and interface of digital data, an Internet Protocol (IP) was established. As part of the IP protocol, a User Datagram Protocol (UDP), and a Transmission Control Protocol (TCP) were set up. Although these protocol have been used to send audio and video data, they are susceptible to errors. In particular, UDP is unreliable by design. And although TCP lets one retransmit a dropped packet, it is not "real-time" enough for streamed audio. Generally, packets of data may inadvertently be dropped or lost. Commonly, the original data may become corrupted and garbled due to noise or other external interferences. Moreover, parts of the original data may be irrecoverable due to attenuation as the data is transmitted over long distances. These errors can seriously degrade the overall audio quality. Often, these errors result in audible "clicks" and "pops." Even small amounts of error can severely impair the listening enjoyment of high-fidelity music. Errors during voice communications can be quite annoying and distracting.

Great effort has been expended in attempting to ensure audio integrity. However, it is virtually impossible to guarantee 100% error-free transmission all of the time. In the past, designers have devised complicated error detection and correction schemes. In one such prior art scheme, an error detection coding is used to detect the occurrence of an error. Once an error has been detected, the party receiving the erroneous data requests that the missing or compromised packet of data be retransmitted. Although this prior art error detection/correction scheme is fairly effective, its main disadvantage is that it cannot be readily applied to real-time applications. It is too complex and takes too much time to correct errors in real-time audio applications where audio is being transmitted "live."

For instance, video teleconferencing is becoming very popular as an alternative to actually traveling and conducting the meeting in person. In the future, more and more workers will be working from their homes and "telecommuting" in to work. Anyone with a modem can hook up to the Internet, local area networks, wide area networks, etc. and exchange communications. In this manner, doctors, executives, engineers, designers, artists, financiers, etc., can conveniently share their thoughts, creations, and ideas over these computer networks. Presently, companies are developing interactive cable systems with "smart" set-top boxes. These systems would allow its users to selectively order TV movies and music, browse and shop for merchandise, conduct banking and finance transactions, etc., all from the convenience of their own homes.

Due to the wide proliferation of real-time audio applications and the problems encountered with transmission errors, there is a real need in the prior art for an apparatus and method to handle these errors. It would be preferable if such an apparatus and method were simple, fast, and yet, effective. The present invention offers such a solution.

SUMMARY OF THE INVENTION

The present invention pertains to a method for concealing errors during transmission of audio data packets. Initially, the fundamental pitch period of a data packet is determined. This fundamental pitch value is added as a preamble to the data packet prior to its transmission. When a data packet is received, it is checked for dropped or corrupted data. If there are any errors, data from the previous packet is replicated the requisite number of times according to the fundamental pitch period and substituted in replacement thereof. In the currently preferred embodiment, the fundamental pitch period is inserted with cross-fade for a smoother transition. The audio is then played back with the synthesized data in place of erroneous or dropped data. Due to the redundant and periodic nature of music and speech, the substituted fundamental pitch period data minimizes the impact of any errors so that they become perceptually insignificant. Thereby, graceful degradation of the audio can be achieved in a real-time basis.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for concealing errors in an audio stream is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention. In the present invention, the audio data is processed and handled in a digital format. Since audio exists in nature in an analog form, an analog-to-digital (A/D) conversion must first be performed to convert the analog audio into an equivalent digital format. This conversion is necessary so that the audio data can then be processed by a computer system, digital signal processor, or some other type of digital electronics.

Figure 1A:
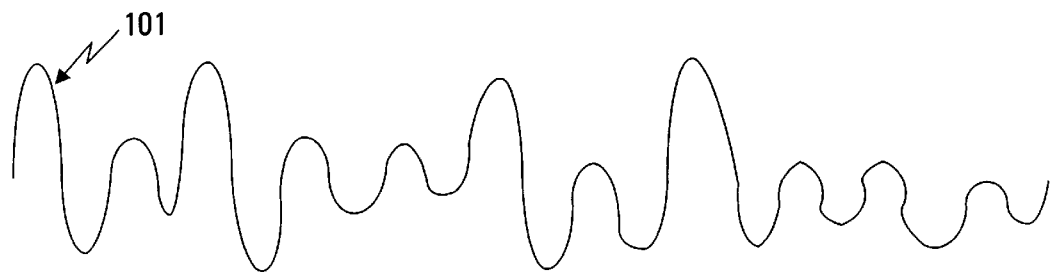
FIG. 1A shows a typical analog audio signal.
Figure 1B:
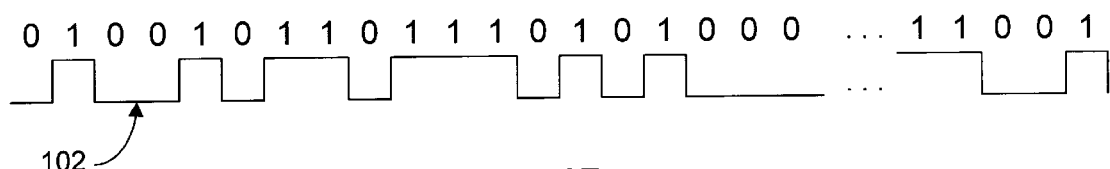
FIG. 1B shows an audio digital stream.
Figure 1C:
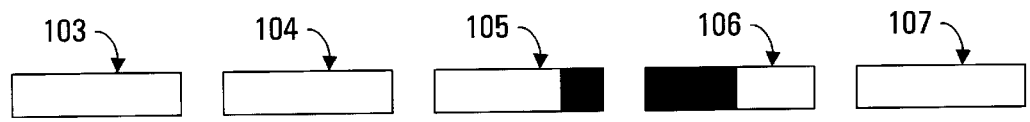
FIG. 1C shows a number of audio data packets.

Referring to FIG. 1A, a typical analog audio signal 101 is shown. Initially, a microphone is used to convert sound into an electrical signal. The electrical signal is then amplified, filtered, and converted into a digital signal. The A/D conversion is accomplished by repeatedly sampling the analog signal at very short, pre-determined time intervals (e.g., every few milliseconds). The resulting digital signal 102 is given by an audio stream that is represented by a series of digital bits (i.e., 1's and 0's), as shown in FIG. 1B. The digital bits (e.g., 0100101101110101000 . . . ) can be encoded and compressed before transmission. Also prior to transmission, the digital bits are grouped into a number of data packets. FIG. 1C shows a number of data packets 103–107. Each data packet contains routing information as well as error detection code and the digital audio data. The routing information specifies the destination location of where that particular data packet is to be transmitted. The error detection code entails adding extra bits which are used to detect when and where an error has occurred. A processor calculates these extra error detection/correction bits based upon the data to be transmitted. There are numerous encoding schemes, such as parity, Hammning code, checksum, etc., which can be applied for this purpose in the present invention. For example, the shaded portions 108 and 109 represent data that was either lost or corrupted during the transmission process of packets 105 and 106, respectively. When a packet is received, the error detection/correction bits are checked to determine whether the received packet contains any errors. Performing this check would indicate that packets 105 and 106 contain missing or erroneous data.

Once it has been determined that there is a problem with a received packet, an error concealment process is applied to minimize the impact of the error. In the present invention, this is accomplished by substituting pre-determined data for the missing or erroneous bits of data. The pre-determined data is synthesized as a function of the correct audio data prior to transmission. The pitch value is then transmitted as part of a preamble or header to the data packet. Each data packet contains a pre-determined preamble containing data that was synthesized from the original audio data. Hence, when an error is detected, the synthesized data contained in the previous frame is inserted in place of the erroneous data. This renders the resulting audio error as being perceptually insignificant. Thereby, the present invention allows for graceful degradation of audio broadcasting in a real-time environment.

Figure 2:
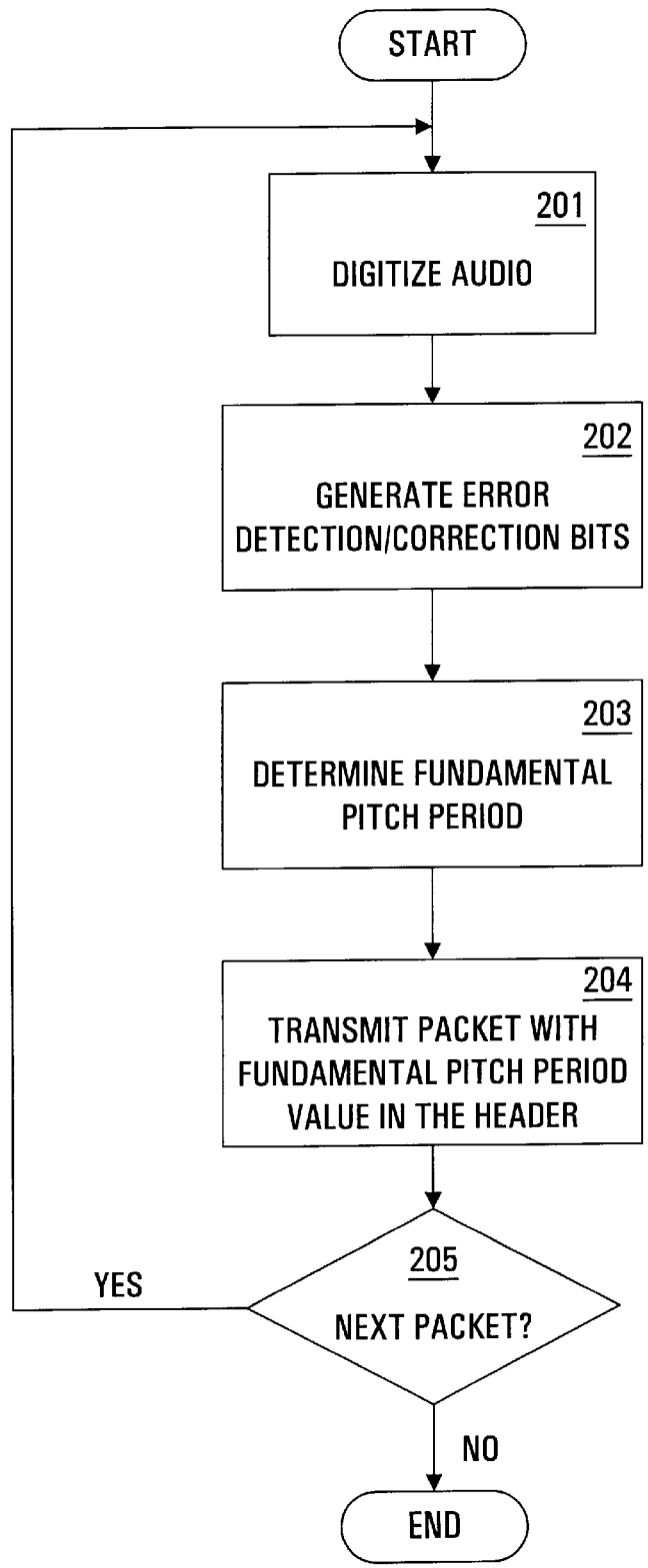
FIG. 2 shows a flowchart describing the steps for encoding an audio packet prior to its transmission.
Figure 3:
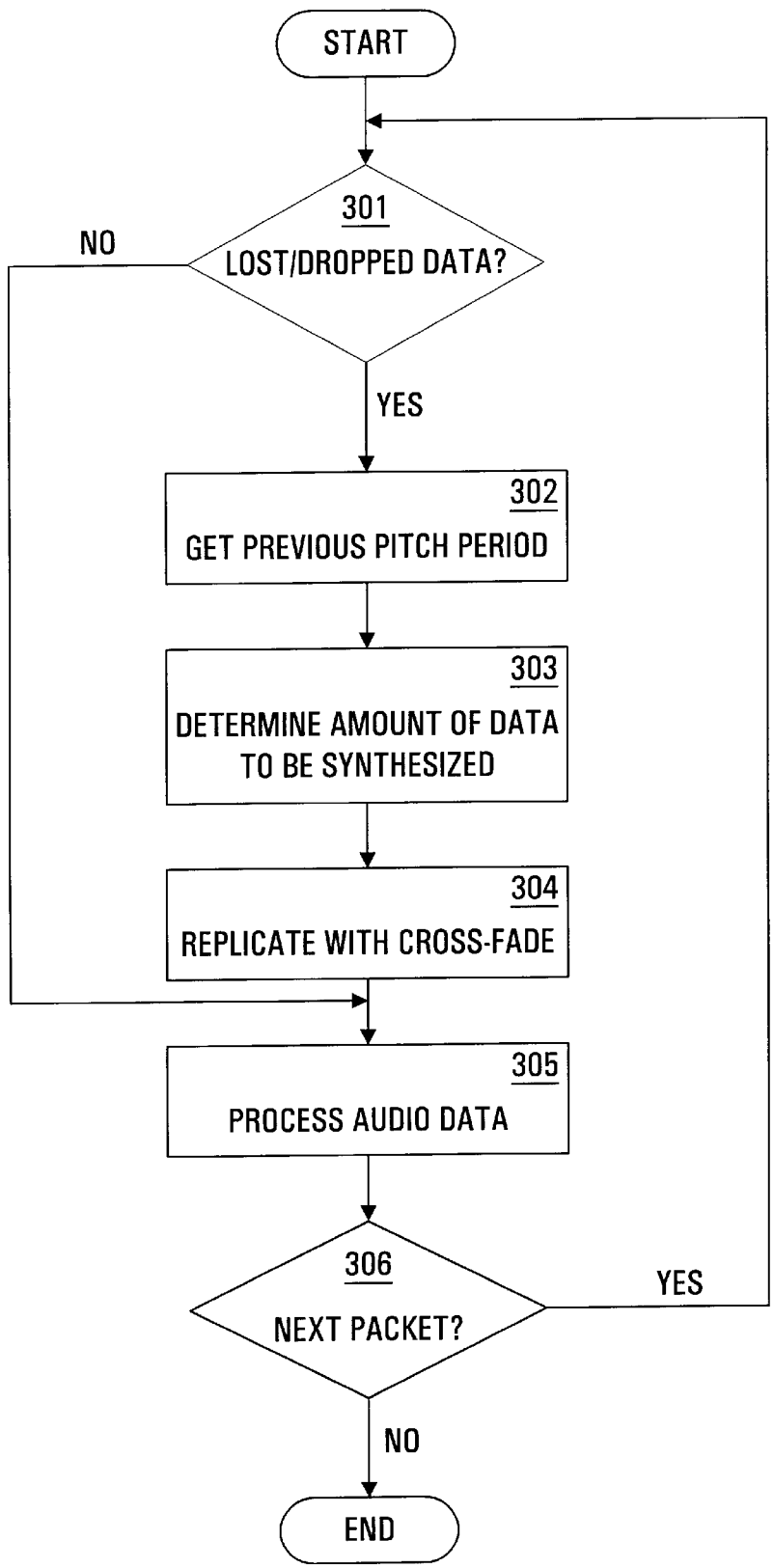
FIG. 3 is a flowchart describing the steps of how a received packet is processed according to the currently preferred embodiment of the present invention.

FIGS. 2 and 3 are flowcharts describing the steps for concealing audio errors according to the preferred embodiment of the present invention. The flowchart of FIG. 2 shows the steps for encoding an audio packet prior to its transmission. Initially, the audio is digitized, step 201. The digitized audio is then divided and grouped into a number of packets for electronic transmission. Each packet contains address information specifying the destination as to where the packet is to be transmitted. In step 202, error detection/correction bits are generated for a packet. These additional bits are included as part of the packet and are also transmitted with the audio data. Furthermore, the fundamental pitch period of the packet is determined, step 203. The fundamental pitch period is defined as the lowest common tone for that packet. The fundamental pitch period has the distinction of being the frequency with the highest correlation. It has been observed that audio (e.g., music, speech, etc.) exhibits the characteristics of redundancy and periodicity. Given these two qualities, multiples of the fundamental pitch period are used as a substitute for the data that is missing or erroneous. There are numerous ways to determine the fundamental pitch period. In the currently preferred embodiment, an autocorrelation function is applied to the data packet. The first "peak" of the autocorrelation result usually signifies the fundamental pitch period. The fundamental pitch period is encoded as a preamble to the data packet. Thereupon, the data packet is transmitted, step 204. Steps 201–204 are repeated for each packet until it is determined in step 205 that there are no more packets to be sent.

FIG. 3 is a flowchart describing the steps for processing a received packet. When a packet is received, a determination is made as to whether that packet has lost or dropped any portion of its data, step 301. It should be noted that the present invention can conceal errors, even in cases where one or more entire packets of data have been irretrievably lost or damaged. The degree to which errors are concealed is a function of the amount of data that is erroneous and the redundancy of the original audio data. If the data packet was transmitted error-free, the audio data is processed for playback, step 305, and the next received packet is processed according to step 301 until all data packets have been received.

Otherwise, if it is determined in step 301 that an error had occurred, steps 302–304 are performed. In step 302, the fundamental pitch period is retrieved from the preamble of the previous data packet. Next, the amount of data that is in error or that was dropped, is determined, step 303. A corresponding amount of substitute data is synthesized by replicating the fundamental pitch period of the previous packet. An exemplary packet might contain 1,500 samples. The fundamental pitch period is replicated the requisite number of times in order to "fill in" the data that was dropped or lost during transmission. The amount of data to be replicated is determined according to the equation n(p), where "p" is fundamental pitch period and "n" is the number of number of times required for replication. For example, if the packet were to correspond to a low tone, the entire data packet might be represented by a single fundamental pitch period (i.e., n=1) because low frequencies translate into longer periods. On the other hand, if the data packet were to correspond to a high tone, it might be required to replicate the fundamental pitch period up to ten times (i.e., n=10). The replicated data is then inserted with cross-fade in place of the lost or damaged data, step 304. Once the error has been thusly concealed, the data is audibly played back, step 305. This process is repeated for each incoming data packet until step 306 determines that there are no more incoming data packets. It should be noted that the error concealment process of the present invention is efficient and effective so that the processing can all be handled in a real-time basis.

Figure 4:
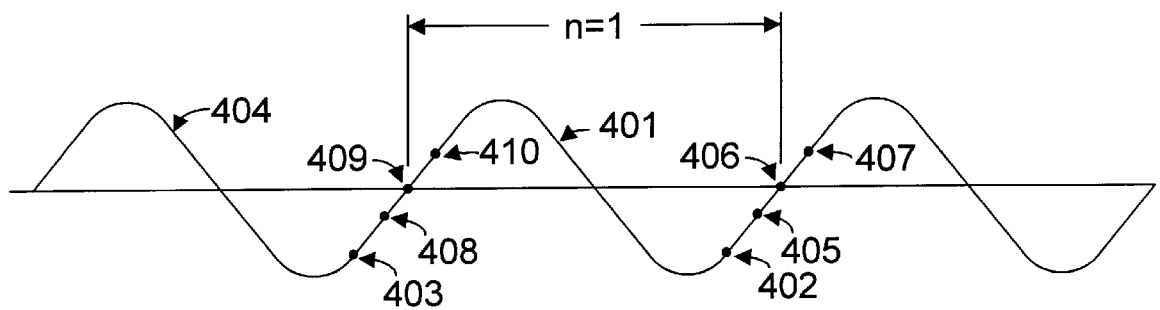
FIG. 4 shows an example of one cycle of a fundamental pitch period with cross-fade.

FIG. 4 shows an example of the inserting of one cycle of a fundamental pitch period 401 with cross-fade. Applying cross-fade renders the transition between the boundaries of existing, original data and any inserted synthesized data much smoother. Basically, data at a boundary is averaged with data values at a corresponding point of a previous boundary. For example, given that the sinusoidal cycle 401 is a synthesized fundamental pitch period, the value of sample point 402 is averaged with the value of sample point 403. Sample point 403 is taken from a previous cycle 404, which was transmitted without any errors. Likewise, the values of sample points 405–407 are averaged with the values of sample points 408–410, respectively.

Figure 5:
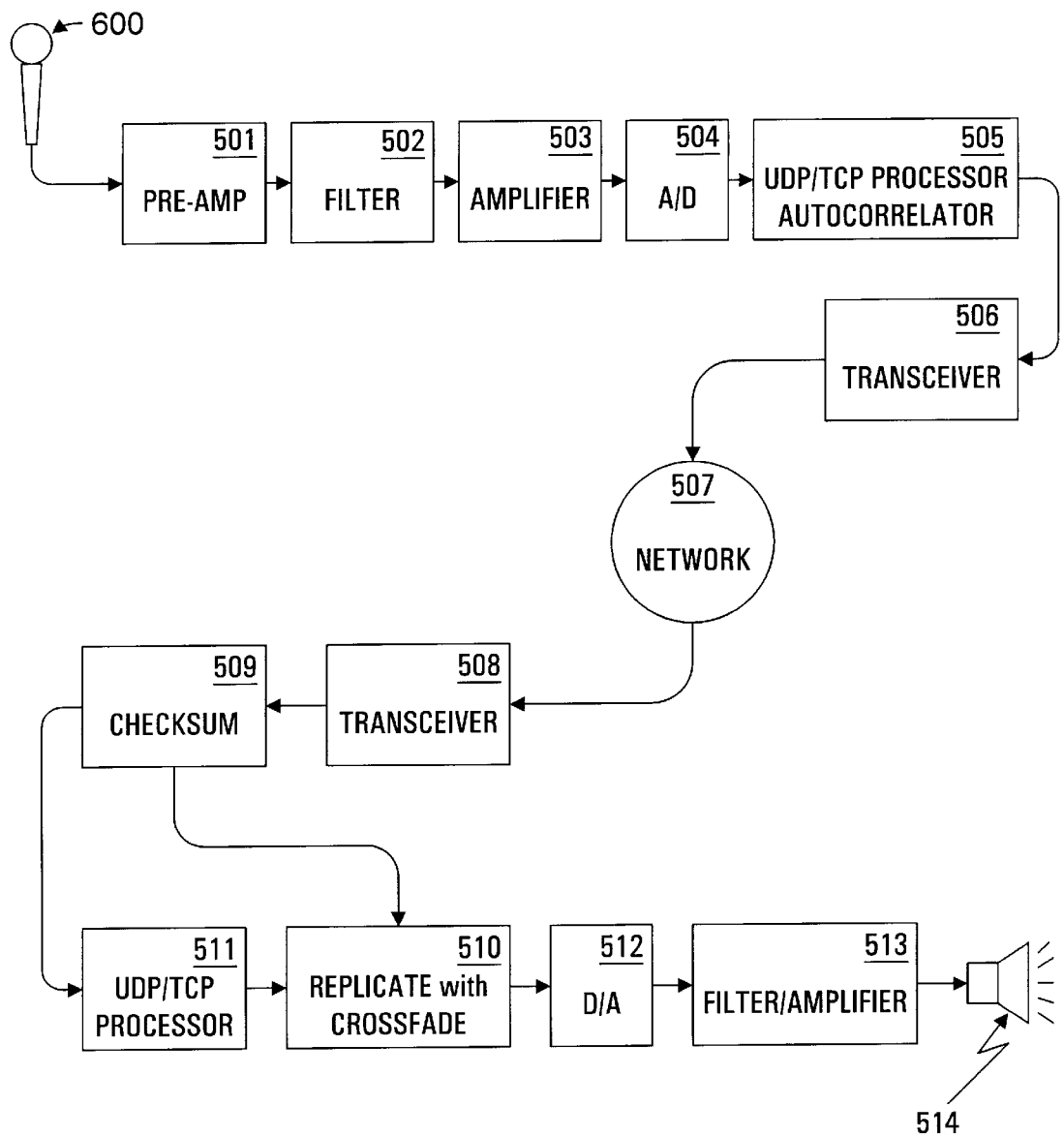
FIG. 5 shows a block diagram of an exemplary system upon which the error concealment of the present invention may be practiced.

FIG. 5 shows a block diagram of an exemplary system upon which the error concealment of the present invention may be practiced. Initially, audio is input through a microphone 500 and pre-amplified. Alternatively, pre-recorded audio may be transmitted. The audio is then filtered 503 and amplified 503. An analog-to digital converter 504 converts the analog audio signal into a digital format. The digitized audio data is then processed into UDP or TCP type packets for transmission by processor 505. Processor 505 also calculates and adds the checksum bits and the fundamental pitch period header. The host station is comprised of blocks 501–506. A transceiver 506 is used to transmit the packets onto the network 507. Network 507 can be comprised of twisted pairs, coaxial cables, fiber optics, etc. Data packets may be sent through routers, bridges, concentrators, etc., of network 507.

Eventually, the data packets arrive at the receiving station, which is comprised of blocks 508–513. When a packet with a matching address is detected by transceiver 508, it is pulled off network 507. A quick checksum operation is performed on that packet by block 509. If there are no errors detected, the data packet is forwarded directly to the UDP/TCP processor 511. Otherwise, any error causes the fundamental pitch period to be pulled from the preamble, replicated, and inserted in place of the erroneous or dropped data with cross-fade by block 510. The data packet is then processed normally by processor 511. A digital-to-analog converter 512 converts the digital data into an analog signal. The analog signal is filtered and amplified via block 513, and played back through speaker 514.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for handling errors in digital audio data, comprising the steps of:

receiving an original data packet;

determining whether there is an error in the original data packet, wherein if there is an error:

a) obtaining a fundamental pitch period contained in a preamble of a previous data packet;

b) replicating the fundamental pitch period a number of times corresponding to an amount of data that is erroneous;

c) inserting the number of fundamental pitch period(s) in place of the erroneous data to produce corrected data;

processing the corrected data for playback through a speaker.

2. The method of claim 1, wherein steps a–c are performed in real-time.

3. The method of claim 1, wherein the fundamental pitch period is inserted with cross-fade.

4. An apparatus for concealing an error in a packet containing digital audio data and including an added preamble containing a value indicating a fundamental pitch period, comprising:

a transceiver for receiving the packet containing digital audio data;

an error detector coupled to the transceiver for detecting the error;

a circuit coupled to the error detector for inserting synthesized data in place of erroneous bits of data, wherein the circuit inserts the synthesized data with cross-fade, wherein the fundamental pitch period from a previous data packet is used to generate the synthesized data;

a digital-to-analog converter for converting the digital audio stream with the synthesized data into an analog signal.

5. The apparatus of claim 4, wherein the synthesized data corresponds to a fundamental pitch period.

6. The apparatus of claim 5, wherein a plurality of fundamental pitch periods are substituted in place of the erroneous bits of data.

7. The apparatus of claim 6, wherein the fundamental pitch period corresponds to the lowest tone having a high correlation to the digital audio stream.

8. The apparatus of claim 4 further comprising an auto-correlator coupled to the transceiver for determining a fundamental pitch period.

9. The apparatus of claim 4, wherein the error concealment is performed in real-time.

10. In a computer network wherein audio data is transmitted by data packets, a method of gracefully degrading any errors that occur during transmission of the data packets, comprising the steps of:

adding a preamble to each of the data packets, wherein the preamble contains a fundamental pitch period corresponding to its particular packet;

checking a received data packet to determine whether there are any dropped or corrupted bits of data;

inserting a previous fundamental pitch period in place of missing or erroneous bits of data.

11. The method of claim 10, wherein the checking and inserting steps are performed in real-time.

12. The method of claim 10 further comprising the step of cross-fading the fundamental pitch period.

\* \* \* \* \*

UNITED STATES PATENT AND TRADEMARK OFFICE
CERTIFICATE OF CORRECTION

PATENT NO : 5,943,347
DATED : August 24, 1999
INVENTOR(S): Stephen Shepard It is certified that error appears in the above-identified patent and that said Letters Patent is hereby corrected as shown below:

On the title page: Item [75]
Stephen Shepard

Signed and Sealed this

Twentieth Day of June, 2000

*Attest:*

Q. TODD DICKINSON

*Attesting Officer*  *Director of Patents and Trademarks*